US008463275B2

(12) United States Patent
Obata et al.

(10) Patent No.: US 8,463,275 B2
(45) Date of Patent: Jun. 11, 2013

(54) MOBILE COMMUNICATION SYSTEM, RADIO CHANNEL CONTROLLER, MOBILE STATION, MOBILE SWITCHING CENTER, AND RADIO CHANNEL CONTROLLING METHOD

(75) Inventors: Kazunori Obata, Yokosuka (JP); Hideyuki Matsutani, Yokohama (JP)

(73) Assignee: NTT DoCoMo, Inc., Chiyoda-ku, Tokyo (JP)

( * ) Notice: Subject to any disclaimer, the term of this patent is extended or adjusted under 35 U.S.C. 154(b) by 833 days.

(21) Appl. No.: 12/266,100

(22) Filed: Nov. 6, 2008

(65) Prior Publication Data

US 2009/0117913 A1  May 7, 2009

(30) Foreign Application Priority Data

Nov. 7, 2007  (JP) .................................. 2007-289349

(51) Int. Cl.
*H04W 40/00* (2009.01)
*H04L 12/28* (2006.01)

(52) U.S. Cl.
USPC .......................................... 455/445; 370/351

(58) Field of Classification Search
USPC ................... 455/405, 450, 452.1, 452.2, 453, 455/509, 512, 515, 516
See application file for complete search history.

(56) References Cited

U.S. PATENT DOCUMENTS

| | | | |
|---|---|---|---|
| 6,137,779 A * | 10/2000 | Miller et al. | 370/236 |
| 6,859,458 B2 * | 2/2005 | Yuang et al. | 370/395.43 |
| 7,359,349 B2 | 4/2008 | Kayama et al. | |
| 7,426,399 B2 | 9/2008 | Ishii et al. | |
| 2003/0103520 A1 | 6/2003 | Chen et al. | |
| 2003/0129973 A1 | 7/2003 | Oishi et al. | |
| 2003/0169746 A1 | 9/2003 | Kitazawa et al. | |
| 2004/0082364 A1 | 4/2004 | Kitazawa et al. | |
| 2004/0224688 A1 | 11/2004 | Fischer | |
| 2006/0047820 A1 * | 3/2006 | Sung et al. | 709/227 |
| 2006/0052103 A1 | 3/2006 | Mikoshiba et al. | |
| 2006/0084445 A1 | 4/2006 | Minami et al. | |
| 2006/0268813 A1 | 11/2006 | Larsson et al. | |
| 2007/0082663 A1 * | 4/2007 | Tam et al. | 455/423 |
| 2007/0293213 A1 * | 12/2007 | Papadimitriou et al. | 455/426.1 |

FOREIGN PATENT DOCUMENTS

| | | | |
|---|---|---|---|
| EP | 1 895 802 A1 | 3/2008 | |
| EP | 1895802 A1 * | 3/2008 | |
| JP | 2003-163667 A | 6/2003 | |
| JP | 2003-169363 A | 6/2003 | |
| JP | 2003-258806 A | 9/2003 | |
| JP | 2003-264860 A | 9/2003 | |
| JP | 2004-140604 A | 5/2004 | |
| JP | 2004-228905 A | 8/2004 | |

(Continued)

*Primary Examiner* — Kent Chang
*Assistant Examiner* — Nathan Brittingham
(74) *Attorney, Agent, or Firm* — Crowell & Moring LLP

(57) ABSTRACT

In a mobile communication system, definite resources in radio sectors are allocated to more users in an aspect that the users hardly feel stress during communication. When a call corresponds to an active call based on an active connection request that has been generated by a user's operation (that is, transmitting and obtaining delivery information of pull-type by means of arrows AC, DL or the like), as a trigger, more resources (communication rate is higher) are allocated to the call. When the call corresponds to a non-active call (that is, receiving and obtaining delivery information of push-type by means of an arrow SU or the like), fewer resources (communication rate is lower) are allocated to the call.

7 Claims, 12 Drawing Sheets

FOREIGN PATENT DOCUMENTS

| | | |
|---|---|---|
| JP | 2004-247950 A | 9/2004 |
| JP | 2005-86588 A | 3/2005 |
| JP | 2006-80884 A | 3/2006 |
| JP | 2006-115291 A | 4/2006 |

* cited by examiner

*FIG. 11*

| ALLOCATION RESOURCE | ALLOCATION TO ACTIVE CALL | ALLOCATION TO NON-ACTIVE CALL |
|---|---|---|
| INDIVIDUAL CHANNEL TRANSMISSION RATE | 64Kbps (DL) /64Kbps (UL) | 32Kbps (DL) /32Kbps (UL) |
| | 64Kbps (DL) /64Kbps (UL) | 32Kbps (DL) /32Kbps (UL) |
| SCHEDULING COEFFICIENT SUCH AS HSDPA, EUL, OR LTE (WEIGHTING : A > B) | A | B |

MOBILE COMMUNICATION SYSTEM, RADIO CHANNEL CONTROLLER, MOBILE STATION, MOBILE SWITCHING CENTER, AND RADIO CHANNEL CONTROLLING METHOD

BACKGROUND OF THE INVENTION

1. Field of the Invention

The present invention relates to a mobile communication system, a radio channel controller, a mobile station, a mobile switching center, and a radio channel controlling method, which are applied to the mobile communication system.

2. Description of the Related Art

In a mobile communication system, how definite radio resources are utilized in an efficient manner is generally required.

As to packet communication, it is believed that service performances sensed by users slightly differ between at the time of transmission and at the time of reception. In other words, the difference in the service performance depends on an active packet communication caused by a user's active action such as sending e-mail or a passive packet communication for a user such as receiving e-mail. In the former case, the degradation in the communication rate is strongly recognized by the user, whereas in the latter case, it is not recognized particularly.

There has been proposed a technique by which, at the time of a packet communication in a mobile communication system, radio resources are preferentially allocated, as the request level of data for immediacy is higher (see JP 2003-163667 A).

The technique described in JP 2003-163667 A is a radio resource controller, which allocates to a terminal device a preferential radio resource that can be used preferentially by the terminal device, on a radio channel. A radio resource among the preferential radio resources to be used for the terminal device is allocated on the basis of the accumulation packet amount accumulated in a transmission buffer that accumulates transmission packets to be transmitted by the terminal device.

The technique, which provides a base station, a radio resource controller, a terminal device, a communication system, and a communication method, is disclosed such that an allowable delay time required for the transmission packet is ensured, the wasteful allocation of the radio resources is prevented, and the efficient use of the radio resources is enabled.

In addition, in a mobile communication system, there has also been proposed a resource allocation method that is changed according to whether the system employs a real-time traffic or a non-real-time traffic. Hence, this intends to improve efficient use of the resources, ensure QoS, and improve service efficiency (see JP 2003-169363 A).

Further, there has been a proposal for providing a radio resource allocation method for aiming efficient use of the radio resources, while satisfying the required quality of the radio resources in a packet transmission (see JP 2003-258806 A).

According to the proposal of JP 2003-258806 A, a threshold value of the packet detention period in a base station is set. When the packet detention period to be scheduled to be sent to a wireless terminal in a group on which attention is focused is equal to or greater than the threshold value, a radio resource is preferentially allocated to the packet.

On the other hand, there has been proposed a technique of obtaining information based upon whether or not there has been a user's action relating to a mobile station, such as information representing that an operation section of the mobile station, for example, has been operated, information representing that the base station to be communicated with has been changed, or the like. Then, the action is taken according to the information (see JP 2003-264860 A).

The technique disclosed in JP 2003-264860 A has a purpose of storing the information on a user's action relating to the mobile station in association with the mobile station, and serving to presume safety of the user based on the stored information at the time of disaster.

Furthermore, there has been proposed a radio channel allocation method for allowing a user to select priority according to the circumstances, and allocating a radio channel to a mobile station according to the selected priority (see JP 2004-228905 A).

There has been another proposal for maintaining and managing resources in a base transceiver station apparatus effectively and flexibly under the condition of various call settings (see JP 2006-80884 A).

In the proposal of JP 2006-80884 A, as to resource consumption due to a request for a new call setting, the resources in the base transceiver station apparatus are changed flexibly, while the change in the setting is being suppressed by keeping the existing link to the utmost.

As described heretofore, JP 2003-163667 A discloses the technique of providing a base station, a radio resource controller, a terminal device, a communication system, and a communication method, thereby enabling effective use of the radio resources by securing the allowable delay time required for the transmission packet and preventing wasteful allocation of the radio resources.

The above technique, however, does not recognize a technical solution of allocating the definite radio resources according to whether or not the communication is established in response to the user's active conduct, while reducing (without increasing) the stress caused by the packet communication rate sensed by the user. This point is not recognized by any other patent documents described above, either.

By comparison, JP 2003-264860 A discloses the technical concept of identifying whether or not there has been a user's action on the mobile station and operating in response thereto.

The technique of JP 2003-264860 A, however, has a purpose of enabling confirming of the safety promptly, while protecting privacy, even if it is difficult to confirm the safety of a resident in a disastrous area such as an earthquake, because a communication cannot be established due to the network congestion.

Accordingly, the aforementioned technique does not focus attention on the reduction of the stress relating to the packet communication rate sensed by the user. Therefore, there have been no technical proposals for intending to handle such a focused attention.

SUMMARY OF THE INVENTION

The present invention has been made in view of the above circumstance and has an object of providing a mobile communication system, a radio channel controller, a mobile station, a mobile switching center, and a radio channel controlling method, whereby definite radio resources can be allocated to more users, while reducing (without increasing) the user's stress caused by the packet communication rate to be sensed.

To solve the above-described problems, the present invention proposes the following techniques.

In a mobile communication system in which a call from a mobile station, in an area of a radio sector of a base transceiver station, is set to communicate with another mobile station or a given server by using a radio resource to be allocated to the mobile station from the base transceiver station, the mobile communication system comprising a radio channel controller at a given node existing in a path of the call, wherein the radio channel controller performs an activeness analyzing process for discriminating whether the call corresponds to an active call based upon an active connection request that has been generated according to a user's operation on the mobile station, as a trigger, or whether the call corresponds to a non-active call that is not the active call, and wherein when the call is discriminated to be the active call by the activeness analyzing process, comparatively more resources are allocated to the call in the radio sector.

In the above mobile communication system in which a call from a mobile station in a radio sector is set to communicate with another mobile station or a given server by using a radio resource that has been allocated from a base transceiver station to the mobile station, a radio channel controller is provided at a given node of a base transceiver station, a radio channel controller or the like existent in a path of the call in the mobile communication system.

The radio channel controller performs an activeness analyzing process for discriminating whether the call corresponds to an active call based upon an active connection request that has been generated according to the user's operation on the mobile station, as a trigger, or whether the call corresponds to a non-active call that is not the active call. When the call is discriminated to the active call by the activeness analyzing process, the resource is allocated in an aspect that comparatively more resources are allocated in the radio sector.

By allocating the radio resource in this manner, more resources are allowed to be assigned to more users, while reducing (without increasing) the user's stress caused by the packet communication rate to be sensed.

There is provided a radio channel controller comprising: received signal analyzing means which performs an activeness analyzing process for analyzing a signal received from an external node and discriminating, as to a setting request of a call recognized with the received signal, whether the call corresponds to an active call based upon an active connection request that has been generated according to a user's operation on a mobile station, as a trigger, or whether the call corresponds to a non-active call that is not the active call; resource allocation information generating means which generates resource allocation information for allocating a corresponding resource to the call in an aspect that comparatively more resources are allocated to the call that has been discriminated to correspond to the active call on the basis of a result of the activeness analyzing process of the received signal analyzing means; and notification means which notifies the resource allocation information that has been generated by the resource allocation information generating means to a corresponding notification destination that allocates the resource according to the resource allocation information.

In the above radio channel controller, an activeness analyzing process is performed by the received signal analyzing means for analyzing a signal received from an external node and discriminating, as to a setting request of a call recognized with the received signal, whether the call corresponds to an active call based upon an active connection request that has been generated according to a user's operation on the mobile station, as a trigger, or whether the call corresponds to a non-active call that is not the active call.

The resource allocation information generating means generates resource allocation information for allocating a resource to the call in an aspect that more resources are allocated to the call that has been discriminated to correspond to the active call on the basis of a result of the activeness analyzing process of the received signal analyzing means.

In addition, the notification means notifies the resource allocation information that has been generated by the resource allocation information generating means to a corresponding notification destination that allocates the resource.

By using the resource allocation information that has been notified as described above, the radio resources are allocated in an appropriate manner. This allows certain radio resources to be allocated to more users while reducing (without increasing) the user's stress caused by the packet communication rate to be sensed.

The above radio channel controller may further comprise management information retaining means which retains management information referred to by the resource allocation information generating means so as to discriminate the resource to be allocated to the call.

In the above radio channel controller, the management information to be referred to so as to discriminate the resource to be allocated to the call is retained in the management information retaining means. This allows the generation of the resource allocation information for allocating an appropriate resource by referring to the management information at a given timing.

In the above radio channel controller, the management information retaining means may retain a resource mapping table as the management information to be relied on by the resource allocation information generating means so as to discriminate the resource to be allocated to the call.

In the radio channel controller, the management information retaining means retains the resource mapping table as the management information to be referred to so that the resource allocation information generating means discriminates the resource to be allocated to the call. Accordingly, the resource allocation information generating means generates the resource allocation information to allocate an appropriate resource by referring to the resource mapping table at a given timing.

The above radio channel controller may further comprise paging transfer history information retaining means which retains paging transfer history information that can be referred to, when the received signal analyzing means performs the activeness analyzing process, the paging transfer history information representing a history of paging transfer from a mobile switching center, relating to the call.

In the above radio channel controller, the paging transfer history information retaining means retains the paging transfer history information representing the history of paging transfer relating to the call from the mobile switching center. By referring to the paging transfer history information at a given timing, the received signal analyzing means performs the activeness analyzing process, and discriminates whether the setting request of the call recognized with the received signal corresponds to the active call or non-active call in an appropriate manner.

There is provided a mobile station adaptable to the above mobile communication system, the mobile station comprising: an operation section which receives an operation of a user; an active connection request identifying section which identifies whether or not a connection request is an active connection request that has been generated by the operation on the operation section, as a trigger, when the connection request is issued to the radio channel controller; an identification information generator which generates identification information representing the active connection request, when the connection request is identified to correspond to the active connection request by the active connection request identifying section; a connection request generator which generates connection request information together with the identification information; and a transceiver which transmits and receives information including the connection request information.

In the above mobile station, when the active connection request identifying section identifies that the connection request issued to the radio channel controller is an active connection request that has been generated according to the operation on the operation section that receives an operation from the user, the identification information generator generates the identification information representing the active connection request.

The connection request generator generates the connection request information together with the identification information, and the connection request information is transmitted to the radio channel controller. Accordingly, the radio channel controller specifically discriminates that the connection request is such an active connection request.

There is provided a mobile switching center adaptable to the above mobile communication system, the mobile switching center comprising: paging transmission history information retaining means which retains paging transmission history information representing a history of paging transmission from the mobile station, relating to the call; activeness analyzing means which performs an activeness analyzing process for analyzing a signal received from an external node, and discriminating, as to a setting request of a call recognized with the received signal, whether the call corresponds to an active call based upon an active connection request that has been generated according to a user's operation on the mobile station, as a trigger, or whether the call corresponds to a non-active call that is not the active call, on the basis of a verification of the call and the paging transmission history information retained by the paging transmission history information retaining means; and activeness discrimination result transmitting means which transmits a discrimination result of the activeness analyzing process performed by the activeness analyzing means to a corresponding base transceiver station controller or a corresponding base transceiver station.

In the above mobile switching center, the paging transmission history information retaining means retains the paging transmission history information representing the history of paging transmission relating to the call from the mobile station.

The activeness analyzing means analyzes the signal received from an external node such as a base transceiver station or the like, and discriminates, as to the setting request of the call recognized with the received signal, whether the call corresponds to an active call based upon the active connection request that has been generated according to a user's operation on the mobile station, as a trigger, or whether the call corresponds to a non-active call that is not the active call, on the basis of the verification of the call and the paging transmission history information retained in the paging transmission history information retaining means, relating the setting request of the call recognized by the received signal.

The above discrimination result is transmitted to the base transceiver station controller or the base transceiver station by the activeness discrimination result transmitting means. The base transceiver station (the above-described radio channel controller installed therein) that has received the discrimination result is allowed to allocate the radio resources in an appropriate manner. This makes it possible to allocate certain radio resources to more users, while reducing (without increasing) the user's stress caused by the packet communication rate to be sensed.

There is provided a radio channel controlling method comprising: analyzing a signal received to discriminate, as to a setting request of a call recognized with the received signal, whether the call corresponds to an active call based upon an active connection request that has been generated according to a user's operation on a mobile station, as a trigger, or whether the call corresponds to a non-active call that is not the active call; generating resource allocation information for allocating a corresponding resource to the call in an aspect that comparatively more resources are allocated to the call that has been discriminated to correspond to the active call on the basis of a result of the analyzing; and notifying the resource allocation information that has been generated to a corresponding notification destination that allocates the resource according to the resource allocation information.

In the above radio channel controlling method, a signal received from an external node, for example, a mobile station is analyzed and discriminated, as to a setting request of a call recognized with the received signal, whether the call corresponds to a call based upon an active connection request that has been generated according to a user's operation on the device, as a trigger, or whether the call corresponds to a non-active call that is not the active call.

The resource allocation information is generated for allocating a resource to the call in an aspect that more resources are allocated to the call that has been discriminated to correspond to the active call on the basis of a result of the activeness analyzing process.

In addition, in the notification process, the resource allocation information that has been generated by the resource allocation information generation process is notified to a corresponding notification destination of, such as, for example, a corresponding functional section or the like of the base transceiver station in which the radio channel controller is installed, so as to allocate the resource.

The radio resource is allocated in an appropriate manner by the resource allocation information that has been notified as described. This allows certain radio resources to be allocated to more users, while reducing (without increasing) the user's stress caused by the packet communication rate to be sensed.

According to one aspect of the present invention, a mobile communication system, a radio channel controller, a mobile station, a mobile switching center, and a radio channel controlling method are achieved in an aspect that certain radio resources are allocated to more users, while reducing (without increasing) user's stress caused by the packet communication rate to be sensed.

BRIEF DESCRIPTION OF THE DRAWINGS

FIG. 11 illustrates a resource allocation state according to one aspect of the present invention.

DETAILED DESCRIPTION OF THE PREFERRED EMBODIMENTS

A description will now be given of embodiments of the present invention, with reference to the accompanying drawings.

(Overview of Technical Concept of the Present Invention)

Figure 1:
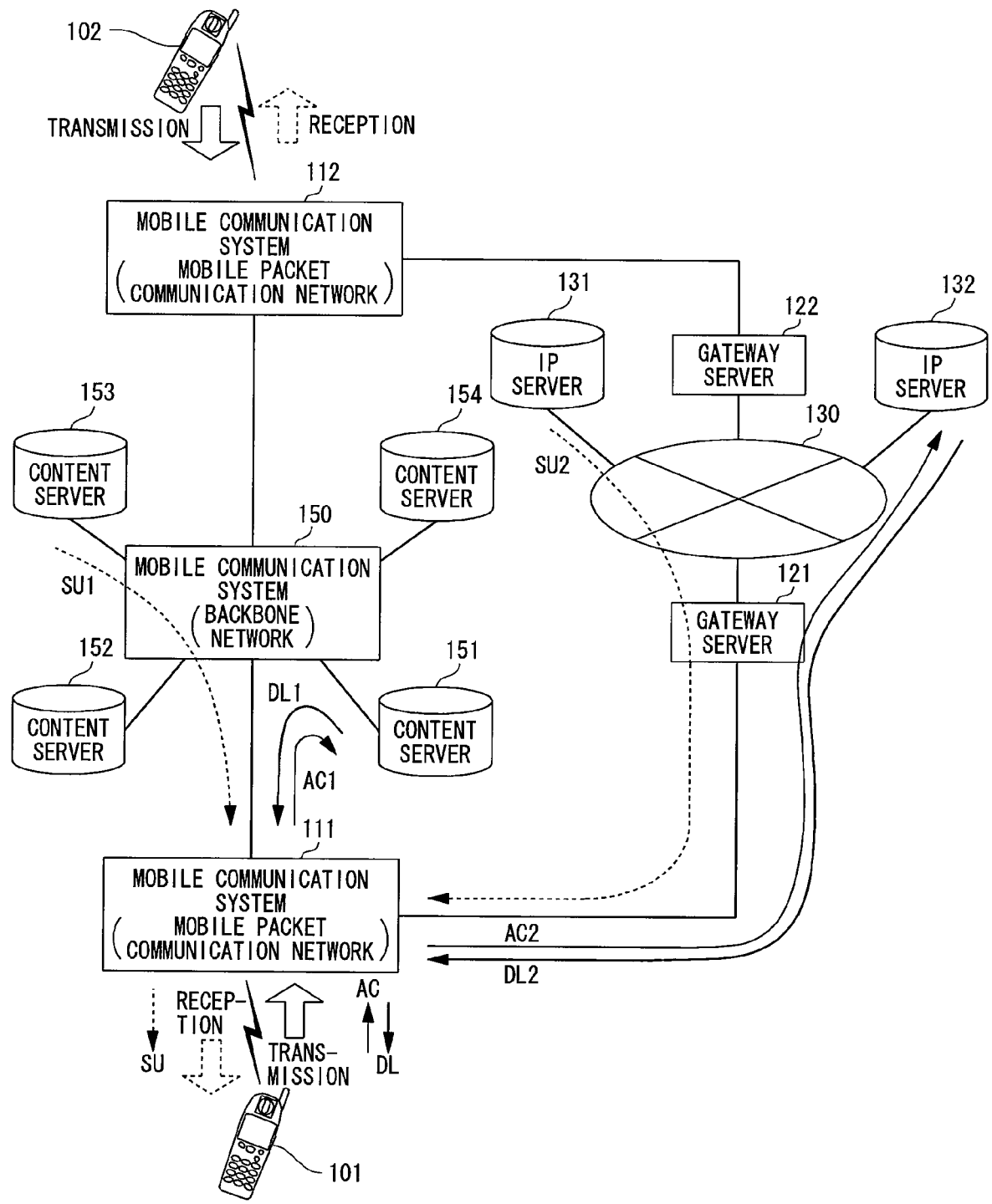
FIG. 1 is a schematic view showing the technical concept of the present invention.

FIG. 1 is a schematic view showing the technical concept of the present invention. FIG. 1 illustrates a mobile communication network (in a broad sense), which enables packet communication between mobile stations 101 and 102 with each other, and which allows the mobile station 101 to obtain desired contents by downloading from the Internet sites, as will be described later.

Mobile communication systems 111 and 112, each of which is configurable as a mobile packet communication network, are coupled to each other through a backbone network 150 that includes an upper known mobile switching center and the like in a mobile communication system. Thereby, the packet communication (e-mail) between the mobile stations 101 and 102 with each other is achieved.

On the other hand, the mobile communication systems 111 and 112 are connected to the Internet 103 via corresponding gateways 121 and 122, respectively.

The Internet 130 is connected by Information Provider (IP) servers 131 and 132, so that web sites are managed by an information provider.

Also, the mobile communication system (backbone network) 150 is connected by content servers 151, 152, 153, and 154, so the content-providing business is managed by an information provider.

In the above configuration, it is assumed that a user of the mobile station 101 carries out a packet communication with another user of the mobile station 102.

When the mobile station 101 is a transmitting side and the mobile station 102 is a receiving side, the user of the mobile station 101 operates the mobile station 101 by himself or herself to conduct a packet transmission actively. Therefore, unless the packet transmission subsequent to the corresponding operation is completed promptly, the user easily feels stress relatively.

In contrast, when the user is a receiving side, the user is in a so-called call-waiting or dormant state. In general, the user is not conscious of when there will be a call incoming to the user's mobile station.

For this reason, in principle, the receiving side is hardly conscious of the lapse of time such as a delay of an incoming call. Accordingly, the receiving side does not feel stress caused by the delay in receiving (incoming call) in a normal call-waiting state.

The similar phenomenon is applied to a case where contents are obtained from the above content servers 151, 152, 153, and 154, or the IP servers 131 and 132.

That is to say, in a so-called pull-type information delivery, a user operates the mobile station by himself or herself so as to access, for example, the content server 151 (schematically represented by solid arrows AC to AC1) or the IP server 142 (schematically represented by solid arrows AC to AC2) and download desired information (such as contents or the like). When required operations are performed for obtaining information and the time for completing downloading of the corresponding content or the like (schematically represented by solid arrows DL1 to DL or DL2 to DL) is prolonged, the user easily feels strong stress relatively.

On the other hand, in a so-called push-type information delivery, for example, the content server 153 or the IP server 141 provides information to users on its own initiative, without waiting for a user's access. In general, users do not feel stress caused by the time required for receiving the information (schematically represented by dotted arrows SU1 to SU or SU2 to SU). This is because the information has been received before the user knows.

Accordingly, in the present invention, a communication resource in a radio sector is allocated in an aspect that comparatively more resources are given (increase the communication rate) to an active call that is a call based on an active connection request that has been generated by a user's operation, as a trigger, and comparatively fewer resources are given (lower the communication rate) to a non-active call. This permits certain radio resources to be allocated to more users, while reducing (without increasing) the user's stress caused by the packet communication rate to be sensed.

In order to accomplish the above description, with respect to the mobile communication system 111 (112) and the mobile station that are shown in FIG. 1 and a mobile switching center that is not shown in FIG. 1, various novel techniques are introduced into the present invention, as will be described later in detail.

(Configuration of One Type of Mobile Communication System to which the Present Invention is Applied)

Figure 2:
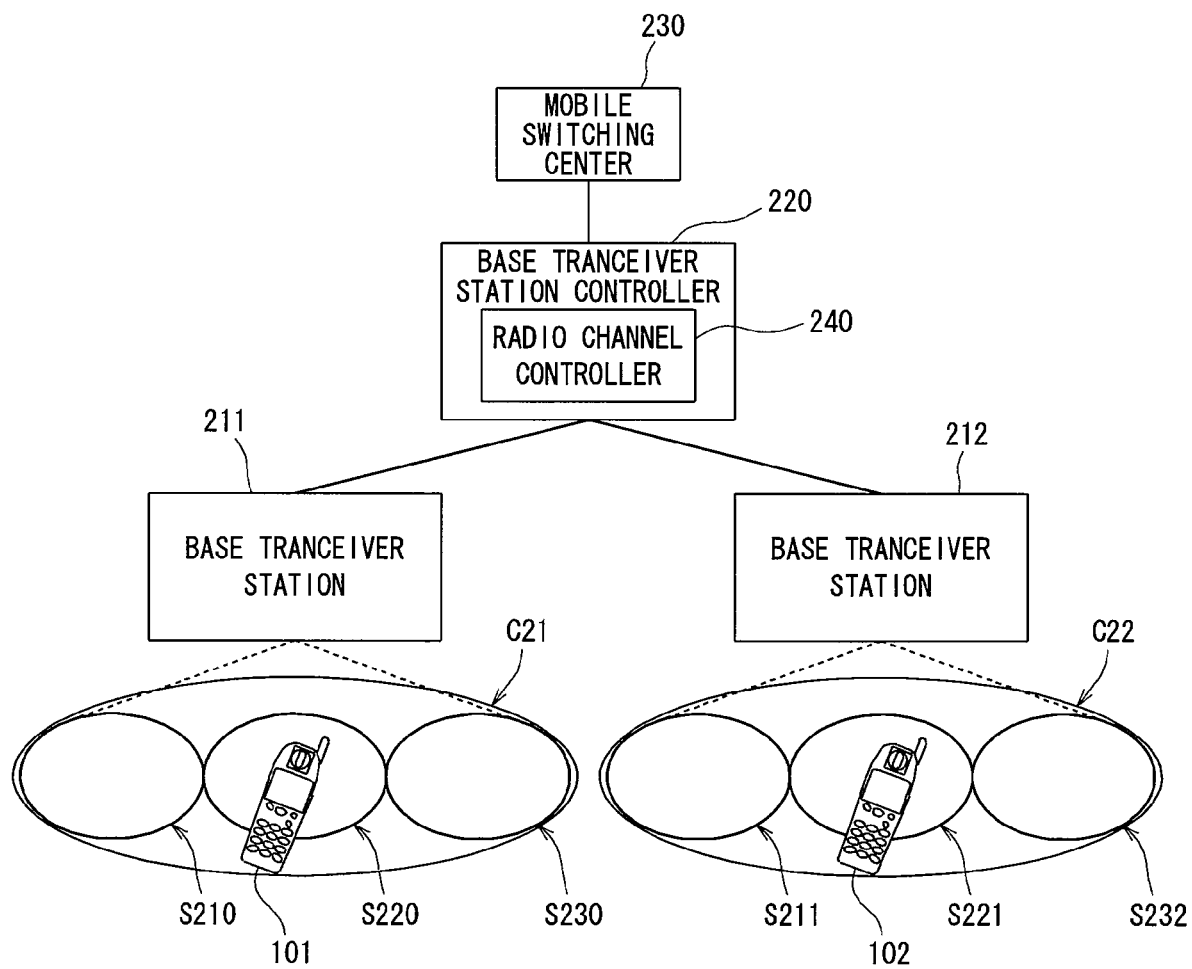
FIG. 2 illustrates a configuration of one type of a mobile communication system to which the present invention is applied.

FIG. 2 illustrates a configuration of one type of a mobile communication system to which the present invention is applied.

The mobile communication system of FIG. 2 complies with one mobile communication system in accordance with the third generation (3G) mobile phone system.

A base transceiver station 211 manages communications of mobile stations in an area of a cell C21 including multiple sectors S210, S220, and S230. Likewise, a base transceiver station 212 manages communications of mobile stations in an area of a cell C22 including multiple sectors S211, S221, and S231.

A base transceiver station controller 220 is provided for performing the overall control on the above multiple (two in FIG. 2) base transceiver stations 211 and 212, and is connected to a backbone network via a mobile switching center 230 of an upper node.

In the illustrated example, the mobile station 101 is existent in (the sector S220 of) the cell C21 and the mobile station 102 is existent in (the sector S221 of) the cell C22.

In the above configuration, the base transceiver station controller 220 is, in particular, provided with a radio channel controller 240 according to one aspect of the present invention. This is a different point from the conventional type of the mobile communication system.

The radio channel controller 240, as will be described later in detail, analyzes a signal received from an external node that is a mobile station, for example, and discriminates, as to a setting request of a call recognized with the received signal, whether the call corresponds to a call based upon an active connection request generated by a user's operation on the mobile station, as a trigger, or whether the call corresponds to a non-active call that is not based upon the active connection request.

In addition, the channels are controlled to allocate the resources to the corresponding calls in an aspect that comparatively more resources are allocated to the calls that have been discriminated to be active calls.

(Configuration of Another Type of Mobile Communication System to which the Present Invention is Applied)

Figure 3:
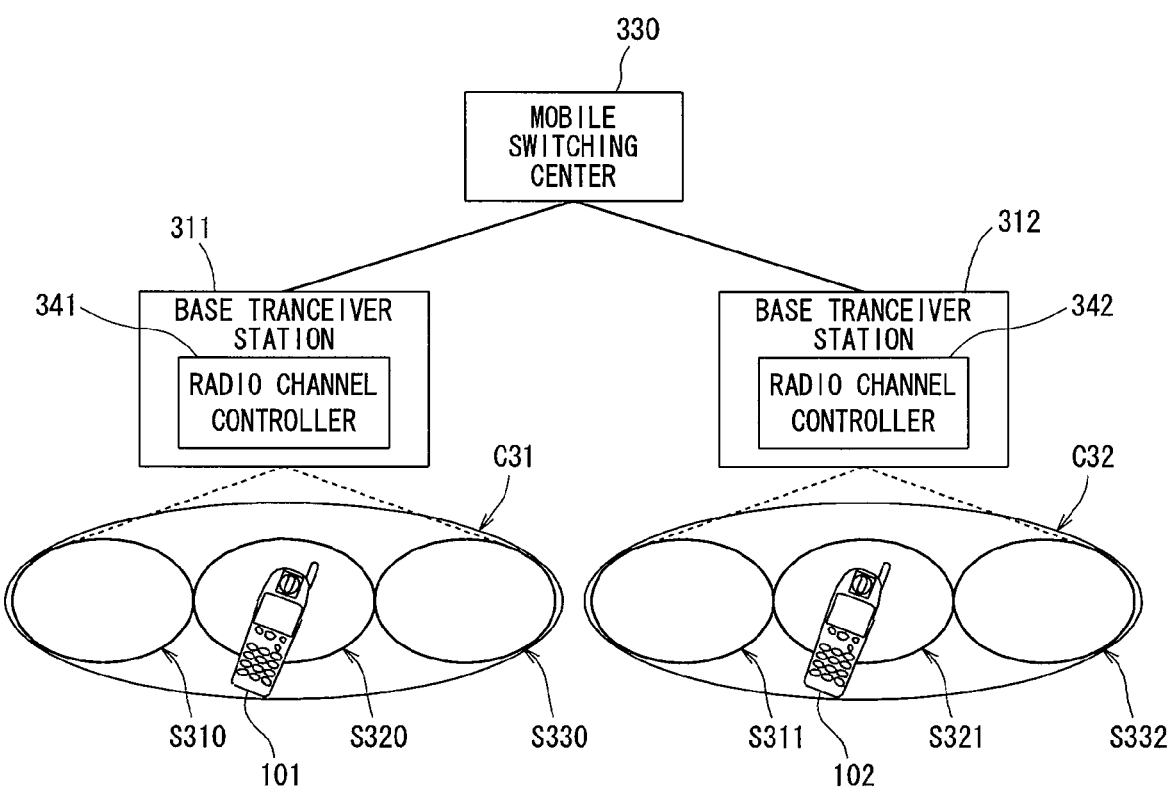
FIG. 3 illustrates a configuration of another type of the mobile communication system to which the present invention is applied.

FIG. 3 illustrates a configuration of another type of the mobile communication system to which the present invention is applied. The mobile communication system of FIG. 3 complies with the Long-Term Evolution (LTE) system, which is an extended system of the 3G mobile phone system.

A base transceiver station 311 manages communications of mobile stations in an area of a cell C31 including multiple sectors S310, S320, and S330. Likewise, a base transceiver station 312 manages communications of mobile stations in an area of a cell C32 including multiple sectors S311, S321, and S331.

The above multiple (two in FIG. 3) base transceiver stations 311 and 312 are connected to a backbone network via a mobile switching center 330 of an upper node.

In the illustrated example, the mobile station 101 is existent in (the sector S320 of) the cell C31 and the mobile station 102 is existent in (the sector S321 of) the cell C32.

In the above configuration, the base transceiver stations 311 and 312 are provided with radio channel controllers 341 and 342, respectively, according to one aspect of the present invention. This is a different point from the conventional type of the mobile communication system that complies with the LTE system.

The configurations of the radio channel controllers 341 and 342 are similar to that of the radio channel controller 240 of FIG. 2, in terms of a functional block, as will be described later in detail with reference to FIG. 4.

In the mobile communication system of FIG. 3, the radio channel controllers 340 and 341, included in the base transceiver stations 311 and 312, respectively, analyzes a signal received from an external node that is a mobile station, for example, and discriminates, as to a setting request of a call recognized with the received signal, whether the call corresponds to an active call based upon an active connection request that has been generated by a user's operation on the mobile station, as a trigger or whether the call corresponds to a non-active call that is not based upon the active connection request.

In addition, the channels are controlled to allocate the resources to the corresponding calls in an aspect that comparatively more resources are allocated to the calls that have been discriminated to be active calls.

(Configuration of Radio Channel Controller of the Present Invention)

Figure 4:
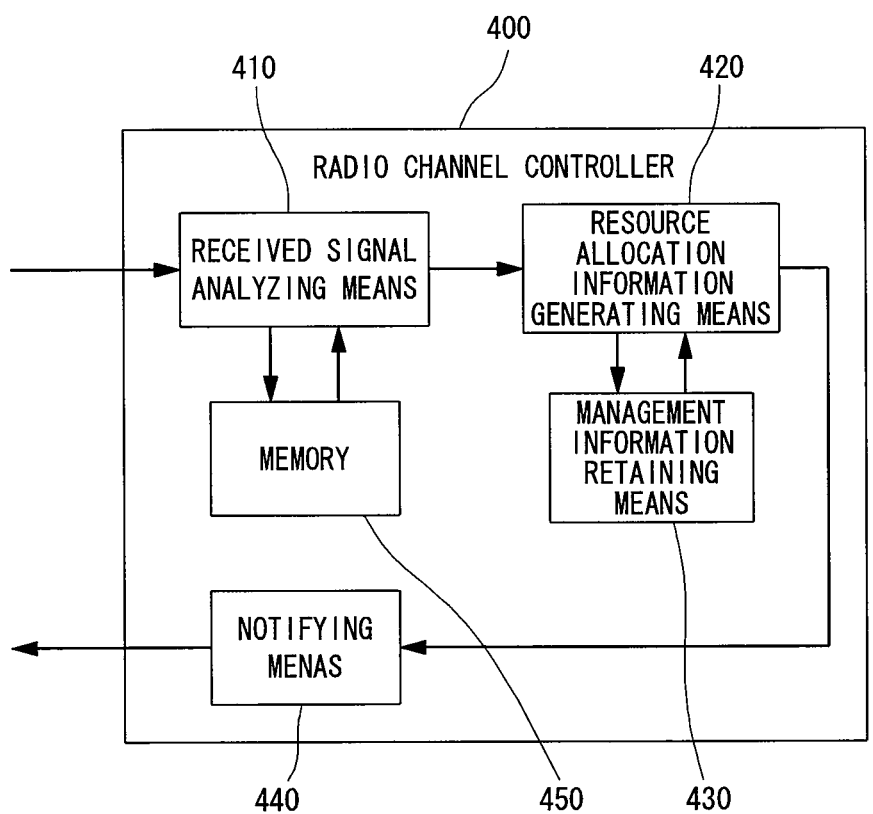
FIG. 4 is a functional block diagram showing a radio channel controller, according to one aspect of the present invention, to be applied to the mobile communication systems of FIG. 2 and FIG. 3.

FIG. 4 is a functional block diagram showing a radio channel controller, according to one aspect of the present invention, to be applied to the mobile communication systems of FIG. 2 and FIG. 3.

The radio channel controller 240 of FIG. 2 and the radio channel controllers 341 and 342 of FIG. 3 are collectively represented by a reference numeral 400 in FIG. 4.

A radio channel controller 400 includes received signal analyzing means 410, resource allocation information generating means 420, and notifying means 440. The received signal analyzing means 410 performs an activeness analyzing process for analyzing a signal received from an external node such as a user's mobile station or the like, and discriminating, as to a setting request of a call recognized with the received signal, whether the call corresponds to an active call based upon an active connection request that has been generated by a user's operation on the mobile station, as a trigger, or whether the call corresponds to a non-active call that is not based upon the active connection request. The resource allocation information generating means 420 generates resource allocation information for allocating the resources to the corresponding calls in an aspect that comparatively more resources are allocated to the calls that have been discriminated to be active calls on the basis of the activeness analyzing process performed by the received signal analyzing means 410. The notifying means 440 notifies the resource allocation information that has been generated by the resource allocation information generating means 420 to a corresponding notification destination so that the resource is allocated according to the resource allocation information.

That is to say, the received signal analyzing means 410 performs an activeness analyzing process for analyzing a signal received from an external node that is a mobile station, for example, and discriminating, as to a setting request of a call recognized with the received signal, whether the call corresponds to an active call based upon an active connection request that has been generated by a user's operation on the mobile station, as a trigger, or whether the call corresponds to a non-active call that is not based upon the active connection request.

The resource allocation information generating means 420 generates resource allocation information for allocating the resources to the corresponding calls in an aspect that comparatively more resources are allocated to the calls that have been discriminated to be active calls on the basis of the activeness analyzing process that has been performed by the received signal analyzing means 410.

According to one aspect of the present invention, there is provided management information retaining means 430 that retains management information relating to the resource allocation in an aspect that the management information can be referred to from the resource allocation information generating means 420. The resource allocation information generating means 420 generates the resource allocation information, referring to by the management information in the management information retaining means 430, as necessary.

The management information retaining means 430 retains a resource mapping table composed of data listed in FIG. 11, as the management information on which the resource allocation information generating means 420 relies in order to discriminate the resource to be allocated to the call.

Therefore, the resource allocation information generating means 420 is capable of generating the resource allocation information in order to refer to the resource mapping table at a given timing and allocate an appropriate resource.

In addition, according to one aspect of the present invention, there is provided a memory 450 that stores information on paging history to be described later, in an aspect that the information can be referred to from the received signal analyzing means 410. The received signal analyzing means 410 generates the resource allocation information, referring to the information relating to the paging history stored in the memory 450.

Further, the notifying means 440 notifies the resource allocation information that has been generated by the resource allocation information generating means 420 to a corresponding notification destination provided for allocating the resource according to the resource allocation information.

Herein, the corresponding notification destination will be demonstrated in more detail by the description with reference to sequential diagrams representing radio channel controlling operations of FIG. 5 to FIG. 8, according to each case. To put it briefly, in the mobile communication system of FIG. 2, the corresponding destination may be the base transceiver station 211 or 212, the mobile station 101 or 102, or the mobile switching center 230, the base transceiver stations 211 and 212 and the mobile stations 101 and 102 being lower nodes of the base transceiver station controller 220 that includes the radio channel controller 240 according to one aspect of the present invention.

Alternatively, in the communication system of FIG. 3, the corresponding destination may correspond to another section (a functional section that manages a different cell) of the base transceiver station 311 that includes the radio channel controller 341 according to one aspect of the present invention, the base transceiver station 312 that includes the radio channel controller 342, the mobile station 101 or 102, or the mobile switching center 330.

The corresponding node that has received the notification as described above operates in response to the resource allocation information as described above. Accordingly, comparatively more resources are allocated to an active call (comparatively fewer resources are allocated to a non-active call), which is a call based upon the active connection request that has been generated by the user's operation, as a trigger. This permits certain radio resources to be allocated to a number of users, while the user's stress caused by the packet communication rate to be sensed is being reduced.

(Radio Channel Controlling Operation in a Mobile Communication System to which the Present Invention is Applied)

Figure 5:
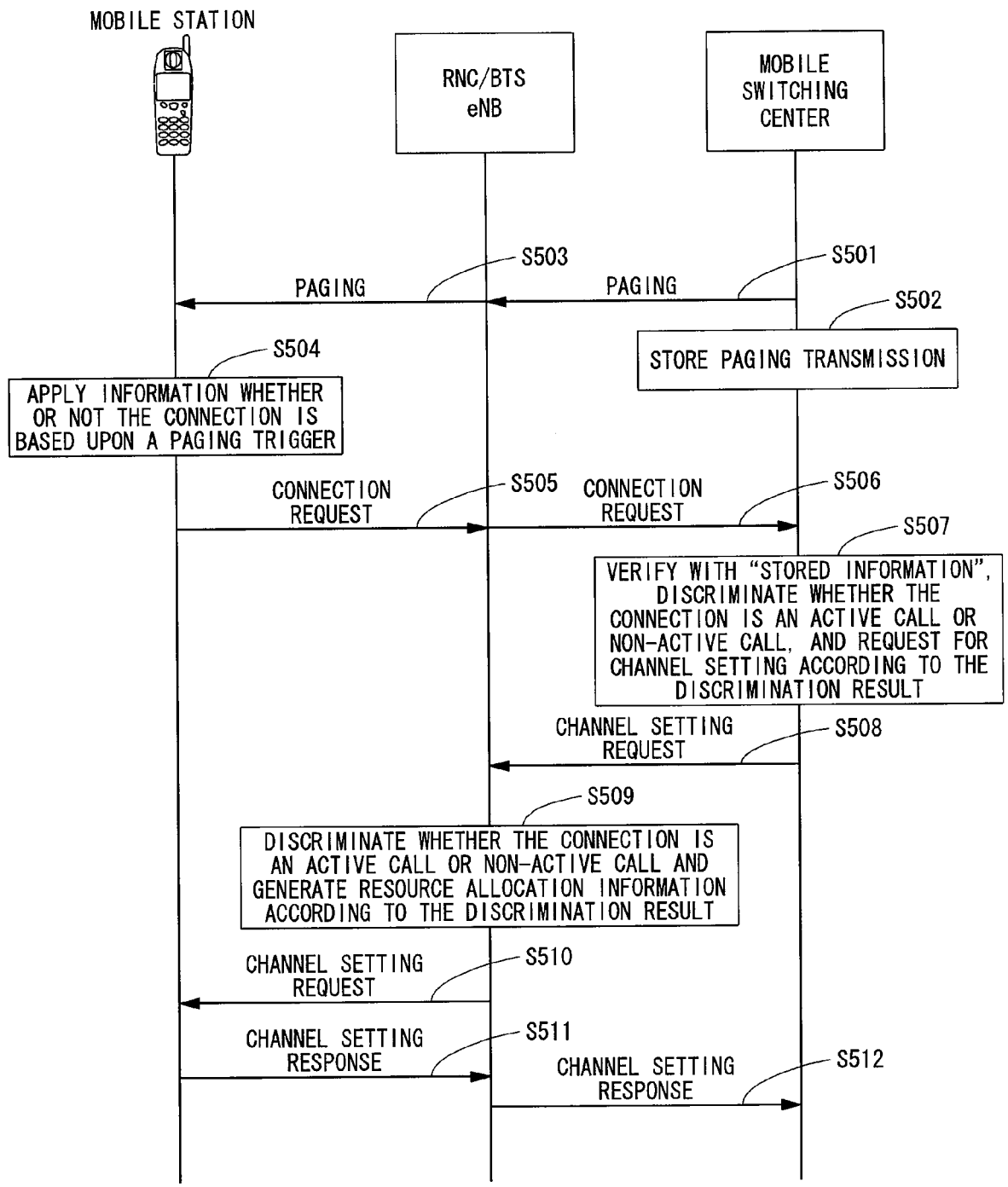
FIG. 5 is a sequential diagram representing a radio channel controlling operation in a mobile communication system to which the present invention is applied.

FIG. 5 is a sequential diagram representing a radio channel controlling operation in a mobile communication system to which the present invention is applied.

The sequential diagram of FIG. 5 shows a radio channel control of a case where a call requiring the setting does not correspond to an active call based on an active connection request that has been generated by a user's operation on the mobile station, as a trigger.

In the drawing, "RNC/BTS, eNB" represents as one block, with attention being focused on the functionality of a component (apparatus) that includes a radio channel controller according to one aspect of the present invention. "RNC/BTS, eNB" corresponds to the base transceiver station controller 220 of FIG. 2 in the 3G system and the base transceiver stations 311 and 312 of FIG. 3 in the LTE system.

"RNC/BTS" collectively represents Radio Network Controller (RNC) and Base transceiver Station (BTS) for the sake of simplification of the sequence diagram. (Therefore, "RNC/BTS" does not mean that there is a device named "RNC/BTS".)

Also, "eNB" is an abbreviation of Evolved Node B, and denotes a base transceiver station in the LTE system.

In the sequential diagram of FIG. 5, the mobile switching center performs paging to the "RNC/BTS, eNB" that has been specified by referring to a Home Location Register (HLR, not shown) or a Visitor Location Register (VLR, not shown), so that all mobile stations existing in an area make a call to receiving sides of the packet communication (including a case of an existing push-type content delivery) (Step S501→Step S502→Step S503).

When the paging is issued to the "RNC/BTS, eNB" at Step 501, a history of transmitting such paging is stored in the mobile switching center simultaneously (Step S502).

The corresponding mobile station that has received the paging via the "RNC/BTS, eNB" at Step S503 performs on a connection request a process of giving information of whether or not the call requiring the setting is a connection according to a paging trigger in response thereto (in this case, this information is affirmative) (Step S504). Then, the connection request to which this information has been given is returned to the mobile switching center via the "RNC/BTS, eNB" (Step S505 Step S506)

The mobile switching center verifies the information received at Step S506 and the history information of transmitting the paging previously stored at Step S502 (Step S507: pre-processing).

In the case of FIG. 5, since the information received at Step S506 matches the history information of transmitting the paging stored at Step S502, it is discriminated that the connection request is not issued from (the user of) the mobile station at his/her own initiative, but the connection request is caused by the paging triggered by a call form an external node such as another mobile station or the like (Step S507: post-processing).

Accordingly, the connection request received at Step S506 is a non-active call, so a channel setting request is issued to the "RNC/BTS, eNB" (its radio channel controller) (Step S508).

The "RNC/BTS, eNB" that has received the channel setting request at Step S508 discriminates whether or not the request is a connection request of an active call at its radio channel controller (in this case, non-active call is discriminated). The "RNC/BTS, eNB" generates resource allocation information in accordance with the discrimination result (non-active call) (Step S509).

In the illustrated example, the resource allocation information is generated at Step S509 so that comparatively fewer resources (transmission rate is lower) according to the non-active call are allocated. This resource allocation information is notified to the mobile station as a channel setting request (Step S510).

In response to the channel setting request at Step S510, a channel connection response is returned from the mobile station to the "RNC/BTS, eNB" (Step S511). The "RNC/BTS, eNB" transfers it to the mobile switching center (Step S512). Then, the comparatively fewer resources (transmission rate is lower) according to the resource allocation information, as described above, are allocated.

Consequently, in the example of FIG. 5, it is possible to reduce the possibility of straining the resource for another communication requiring comparatively more resources (transmission rate is higher) in an identical radio sector (service area).

(Radio Channel Controlling Operation in Another Mobile Communication System to which the Present Invention is Applied)

Figure 6:
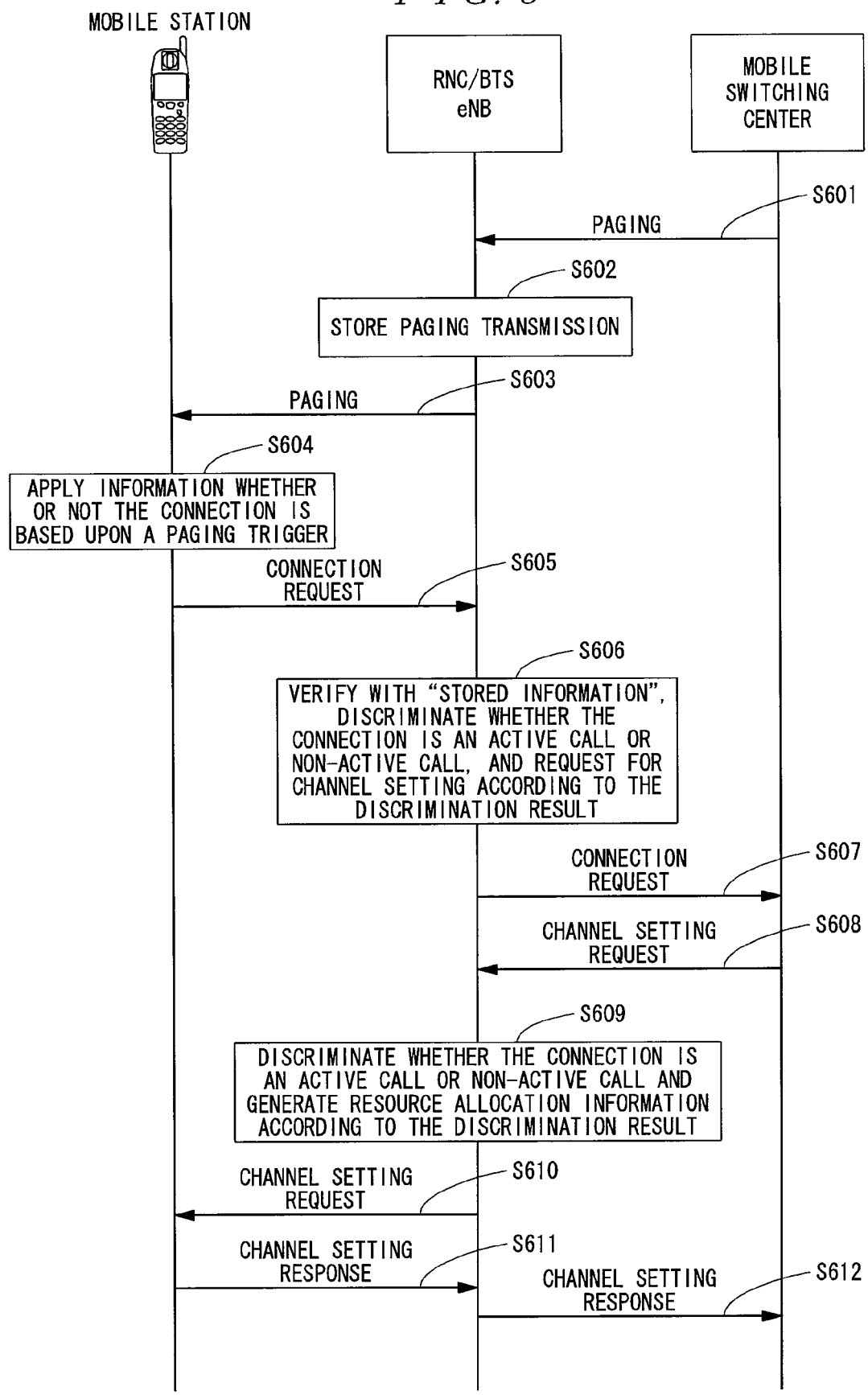
FIG. 6 is a sequential diagram representing a radio channel controlling operation in another mobile communication system to which the present invention is applied.

FIG. 6 is a sequential diagram representing a radio channel controlling operation in another mobile communication system to which the present invention is applied.

The sequence illustrated in FIG. 6 is similar to that of the radio channel control of FIG. 5 in that the radio channel control is performed for a case where the call requiring the setting is a non-active call, which does not correspond to a call based upon the active connection request that has been generated by a user's operation on the mobile station, as a trigger.

In the example of FIG. 6, however, a history of paging transfer is stored in the "RNC/BTS, eNB" in particular so as to discriminate whether or not the connection request is based upon the active call or non-active call, by verifying the stored history with the connection request issued from the mobile station.

In FIG. 6, the mobile switching center performs paging to all mobile stations existing in that area via the "RNC/BTS, eNB" that has been specified by referring to the HLR (not shown) or the VLR (not shown), as if the mobile switching center made a call to receiving sides of the packet communication (including a case of an existing push-type content delivery) (Step S601).

In the sequential diagram of FIG. 6, however, the mobile switching center does not retain the history of paging transfer in particular. The history of paging transfer is stored in the "RNC/BTS, eNB" (Step S602), and the paging itself is transferred to the mobile station (Step S603).

At Step S603, the corresponding mobile station that has received the paging via the "RNC/BTS, eNB" at Step S503 performs on a connection request a process of giving information of whether or not the call requiring the setting is a connection according to a paging trigger in response thereto (in this case, this information is affirmative) (Step S604). Then, the connection request to which this information has been given is returned to the mobile switching center via the "RNC/BTS, eNB" (Step S605)

The "RNC/BTS, eNB" verifies the information received at Step S605 and the history information of transmitting the paging previously stored at Step S602 (Step S606: pre-processing).

In the case of FIG. 6, since the information received at Step S605 matches the history information of transmitting the paging stored at Step S602, it is discriminated that the connection request is not issued from (the user of) the mobile station at his/her own initiative, and the connection request is caused by the paging triggered by a call form an external node such as another mobile station or the like (Step S606: post-processing).

While the "RNC/BTS, eNB" is making the above discrimination at Step S606, the "RNC/BTS, eNB" transfers the connection request that received at Step S605 to the mobile switching center (Step S607).

The mobile switching center that received the connection request at Step S607 issues a channel setting request to the "RNC/BTS, eNB" (its radio channel controller) (Step S608).

The "RNC/BTS, eNB" that received the channel setting request at Step S608 discriminates whether or not the request is a connection request of an active call at its radio channel controller (in this case, non-active call is discriminated) The "RNC/BTS, eNB" generates resource allocation information in accordance with the discrimination result (non-active call) (Step S609).

In the illustrated example, the resource allocation information is generated at Step S609 so that comparatively fewer resources (transmission rate is lower) according to the non-active call are allocated. This resource allocation information is notified to the mobile station as a channel setting request (Step S610).

In response to the channel setting request at Step S610, a channel connection response is returned from the mobile station to the "RNC/BTS, eNB" (Step S611). The "RNC/BTS, eNB" transfers it to the mobile switching center (Step S612). Then, comparatively fewer resources (transmission rate is lower) according to the resource allocation information, as described above, are given.

Consequently, in the example of FIG. 6, the possibility of straining the resource for another communication requiring comparatively more resources (transmission rate is higher) in an identical radio sector (service area) is reduced.

(Radio Channel Controlling Operation in Yet Another Mobile Communication System to which the Present Invention is Applied)

Figure 7:
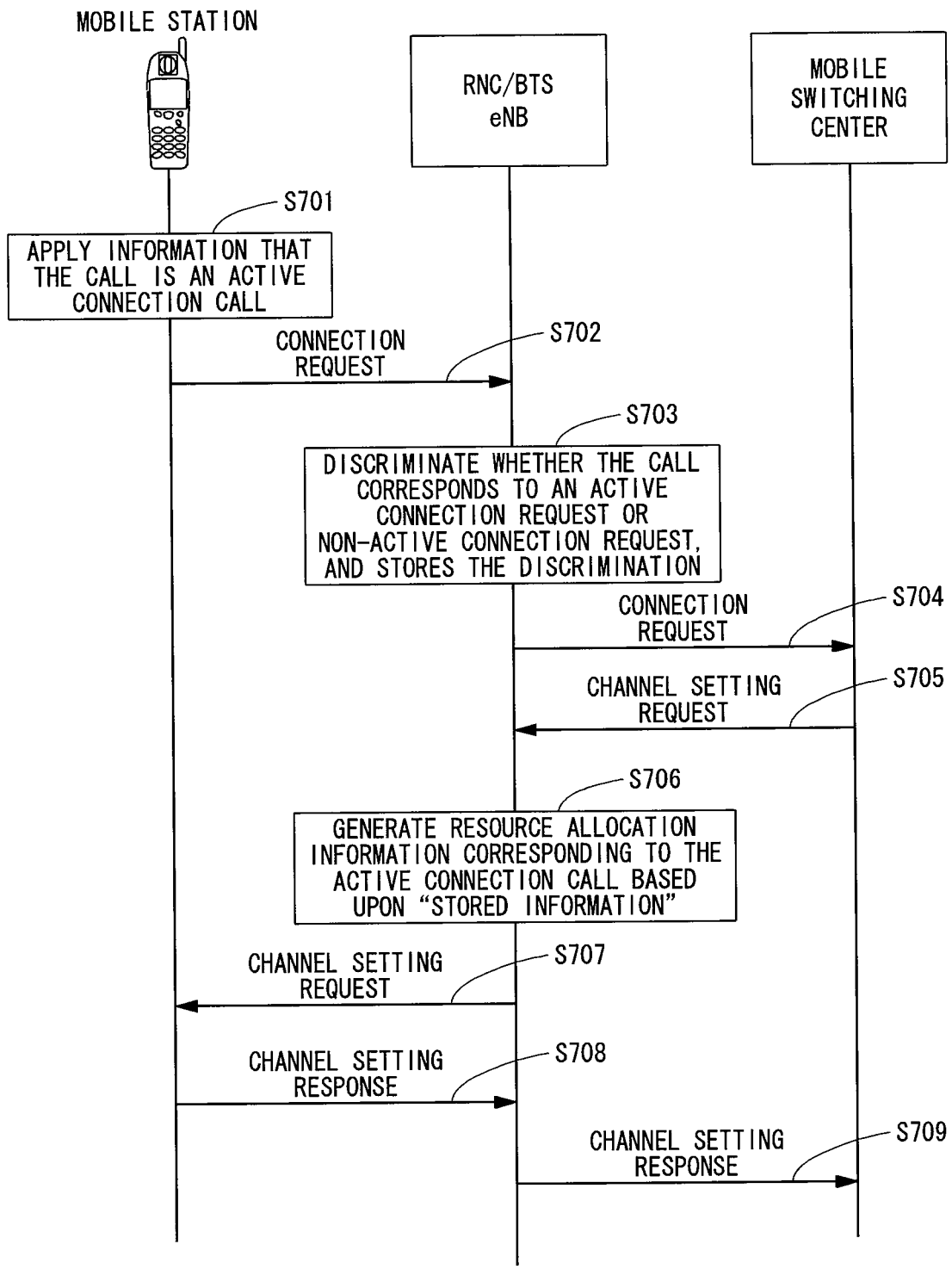
FIG. 7 is a sequential diagram representing a radio channel controlling operation in another mobile communication system to which the present invention is applied.

FIG. 7 is a sequential diagram representing a radio channel controlling operation in another mobile communication system to which the present invention is applied.

The sequence illustrated in FIG. 7 shows a radio channel control of a case where a call requiring the setting corresponds to an active call based on an active connection request that has been generated by a user's operation on a mobile station, as a trigger.

In the example of FIG. 7, the mobile station is equipped with a function of, when the mobile station issues a connection request from the mobile station itself according to the user's operation, identifying whether or not the connection request is an active connection request that has been generated by the user's operation on the mobile station itself, as a trigger. The mobile station is also equipped with a function of generating connection request information (connection request) together with identification information representing the active connection request and being capable of transmitting the connection request information, when the connection request is an active connection request.

The configuration of the mobile station having the above functions will be described later in detail with reference to FIG. 9.

When the connection request is issued from the mobile station, in response to the user's operation, firstly, the connection request together with the identification information representing the active connection request as described above is generated (Step S701), the connection request together with the identification information generated at Step S701 is transmitted to the "RNC/BTS, eNB" (Step S702).

The "RNC/BTS, eNB" discriminates whether it is the above-described active connection or non-active connection on the basis of the connection request received at Step S702, and stores the discrimination result (Step S703).

In the case of FIG. 7, the connection request together with the identification information representing the active connection request is generated at Step S701, and then the connection request is transmitted (Step S702). The discrimination result of an active connection call is stored (Step S703).

At Step S703, the "RNC/BTS, eNB" stores the discrimination result of the connection of an active call. Subsequently, the connection request is transmitted from the "RNC/BTS, eNB" to the mobile switching center (Step S704).

In response to the connection request at Step S704, the mobile switching center issues a channel setting request to the "RNC/BTS, eNB" (Step S705).

The "RNC/BTS, eNB", in response to the channel setting request at Step S705, generates the resource allocation information according to the discrimination result that the connection of the active call that has previously been stored at Step S703 (Step S706).

In the illustrated example, at Step S706, the resource allocation information is generated so that comparatively more resources (transmission rate is higher) according to an active call are allocated. Such resource allocation information is notified to the mobile station as a channel setting request (Step S707).

In response to the channel setting request at Step S707, a channel connection response is returned from the mobile station to the "RNC/BTS, eNB" (Step S708). The "RNC/BTS, eNB" transfers it to the mobile switching center (Step S709). Consequently, comparatively more resources (transmission rate is higher) are allocated on the basis of the above-described resource allocation information.

Accordingly, in the example of FIG. 7, a sufficient resource is given appropriately to the communication requiring the allocation of the comparatively more resources (transmission rate is higher) in an identical radio sector (service area). This enables pleasant and convenient communication with a less waiting time to be sensed, while hardly feeling stress.

(Radio Channel Controlling Operation in Yet Another Mobile Communication System to which the Present Invention is Applied)

Figure 8:
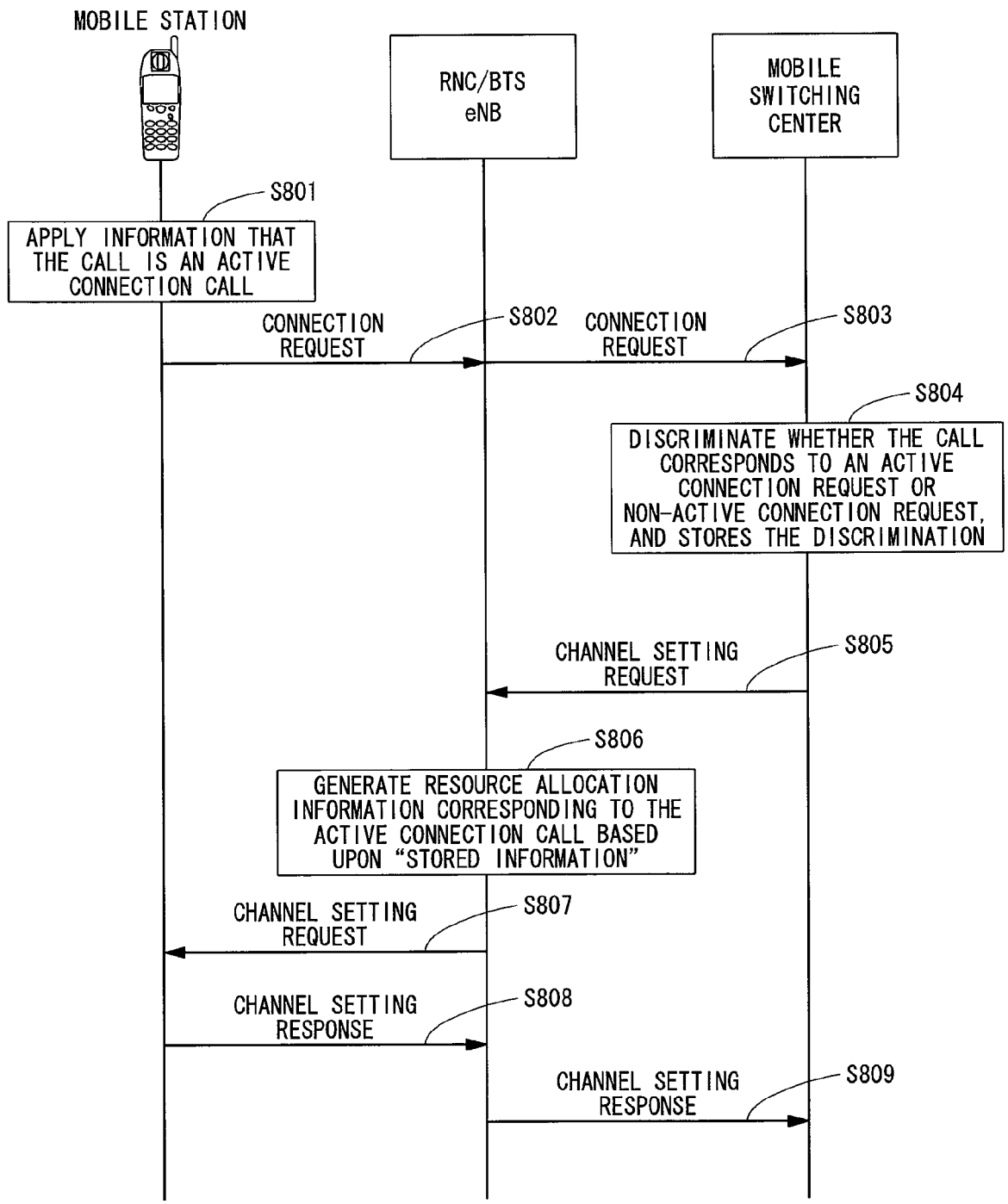
FIG. 8 is a sequential diagram representing a radio channel controlling operation in yet another mobile communication system to which the present invention is applied.

FIG. 8 is a sequential diagram representing a radio channel controlling operation in yet another mobile communication system to which the present invention is applied.

The sequence illustrated in FIG. 8 shows a radio channel control of a case where a call requiring the setting corresponds to an active call based on an active connection request that has been generated by a user's operation on a mobile station, as a trigger.

In the example of FIG. 8, as with the example of FIG. 7, the mobile station is equipped with a function of, when the mobile station issues a connection request from the mobile station itself according to the user's operation, identifying whether or not the connection request is an active connection request that has been generated by the user's operation on the mobile station itself, as a trigger. The mobile station is also equipped with a function of generating connection request information together with identification information representing the active connection request and being capable of transmitting the connection request information, when the connection request is an active connection request.

In the above-described example of FIG. 7, however, the "RNC/BTS, eNB" discriminates whether it is the connection of an active call or a non-active call, whereas in the example of FIG. 8, the mobile switching center discriminates it. Therefore, it should be noted that the mobile switching center having a function of discriminating whether the connection is based on an active call or a non-active call is employed.

The configuration of the mobile station having the above functions will be described later in detail with reference to FIG. 10.

When the connection request is issued from the mobile station, in response to the user's operation, firstly, the connection request together with the identification information representing the active connection request as described above is generated (Step S801).

The connection request together with the identification information generated at Step S801 is transmitted to the "RNC/BTS, eNB" (Step S802).

The "RNC/BTS, eNB" relays the connection request received at Step S802 and transfers it to the mobile switching center (Step S803).

The mobile switching center that received the connection request at Step S803 discriminates whether it is the above-described connection of an active call or an non-active call (in this case, discriminates to be the connection of an active call) on the basis of the identification information (in this case, the identification information representing an active connection request), and stores the discrimination result (Step S804).

Subsequent to Step S804, the mobile switching center issues a channel setting request to the "RNC/BTS, eNB" (Step S805).

The "RNC/BTS, eNB", in response to the channel setting request at Step S805, generates the resource allocation information according to the discrimination result that the mobile switching center previously stored the connection of the active call at Step S804 (Step S806).

In the illustrated example, at Step S806, the resource allocation information is generated so that comparatively more resources (transmission rate is higher) according to an active call are allocated. Such resource allocation information is notified to the mobile station as the channel setting request (Step S807).

In response to the channel setting request at Step S807, a channel connection response is returned from the mobile station to the "RNC/BTS, eNB" (Step S808). The "RNC/BTS, eNB" transfers it to the mobile switching center (Step S809). Consequently, comparatively more resources (transmission rate is higher) are allocated on the basis of the above-described resource allocation information.

Accordingly, in the example of FIG. 8, a sufficient resource is given appropriately for the communication requiring comparatively more resources (transmission rate is higher) are allocated in an identical radio sector (service area). This enables pleasant and convenient communication with a less waiting time to be sensed, while hardly feeling stress.

(Configuration Example of a Mobile Station)

Figure 9:
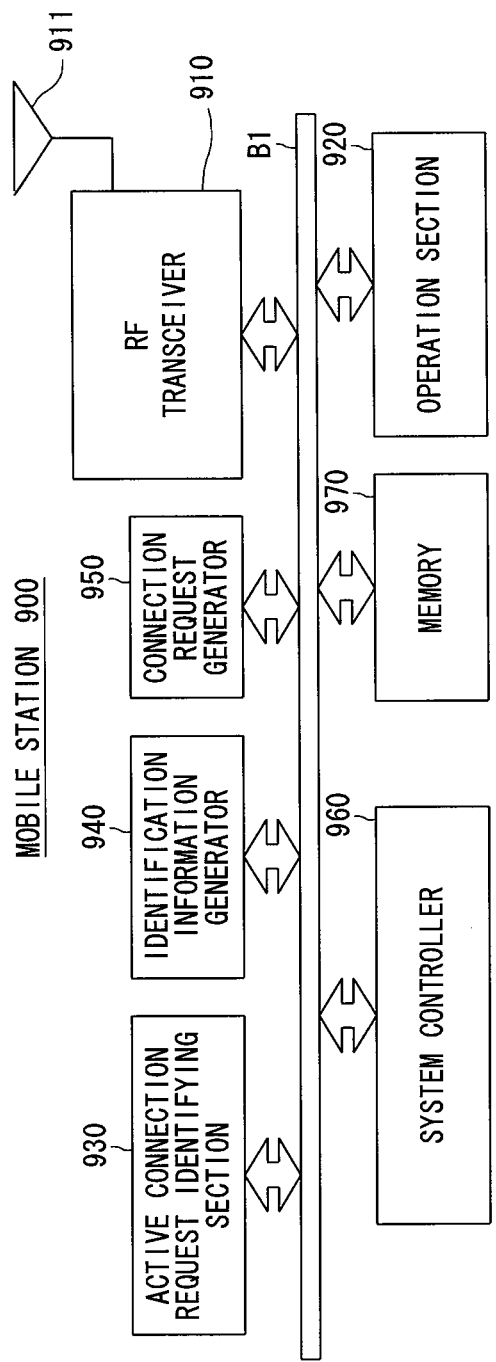
FIG. 9 is a functional bock diagram illustrating a configuration of a mobile station applied to the mobile communication system corresponding to the description of FIG. 5 through FIG. 8.

FIG. 9 is a functional bock diagram illustrating a configuration of a mobile station applied to the mobile communication system corresponding to the description of FIG. 5 through FIG. 8.

A mobile station 900 has an RF transceiver 910. The RF transceiver 910 conducts a radio communication with an external target via an antenna 911. The RF transceiver 910 is provided with a known AD converting function section, not shown, and a known DA converting function section, not shown, and sends and receives data to and from other components via a bus B1.

An operation section 920 is provided so as to receive a user's operation by means of, for example, operation keys such as number keys or arrow keys or by means of a touch panel.

A connection request is issued to the above-described radio channel controller ("RNC/BTS, eNB" including the radio channel controller), so an active connection request identifying section 930 is connected to the bus B1. The active connection request identifying section 930 identifies whether or not the connection request is an active connection request that has been generated according to the operation on the operation section 920, as a trigger.

When the active connection request identifying section 930 identifies that the connection request is an active connection request, an identification information generator 940 connected to the bus B1 generates the identification information representing the active connection request.

A connection request generator 950 that has received the above-described identification information form the identification information generator 940 via the bus B1 generates the connection request information together with the identification information.

The connection request information that has been generated by the connection request generator 950 is sent through the bus B1, and is then sent from the RF transceiver 910 serving as a transceiver to the radio channel controller (the "RNC/BTS, eNB" including the radio channel controller). Consequently, the radio channel controller specifically discriminates that the connection request is the above-described active connection request.

The RF transceiver 910, the operation section 920, the active connection request identifying section 930, the identification information generator 940, and the connection request generator 950 are configured to perform given functions respectively under the management of a system controller 960, which performs the overall management of the whole system of the mobile station 900 via the bus B1.

The active connection request identifying section 930, as described above, identifies whether or not the connection request is an active connection request that has been generated according to the operation on the operation section 920, as a trigger.

When the mobile station 900 functions as described above, with reference to FIG. 7 and FIG. 8, the operation on the operation section 920 is recognized and an active connection request is identified.

On the other hand, when the mobile station 900 functions as described above, with reference to FIG. 5 and FIG. 6, even if a user operates the operation section 920, the operation does not correspond to a trigger for call setting. Therefore, such an operation is not recognized as a trigger for call setting.

In this case, paging sent from "RNC/BTS, eNB" is received by the RF transceiver 910, and is supplied to the active connection request identifying section 930 through the bus B1 under the management of the system controller 960.

In response to the paging, the active connection request identifying section 930 discriminates that the connection request is a non-active connection request.

In addition, the bus B1 is connected by a memory 970 which is accessed under the management of the system controller 960, so that the mobile station 900 fulfills the function of satisfying given specifications according to the installed program. Alternatively, the mobile station 900 is configured to accumulate image data that has been captured by a camera section, not shown.

(Configuration of Mobile Switching Center According to the Present Invention)

Figure 10:
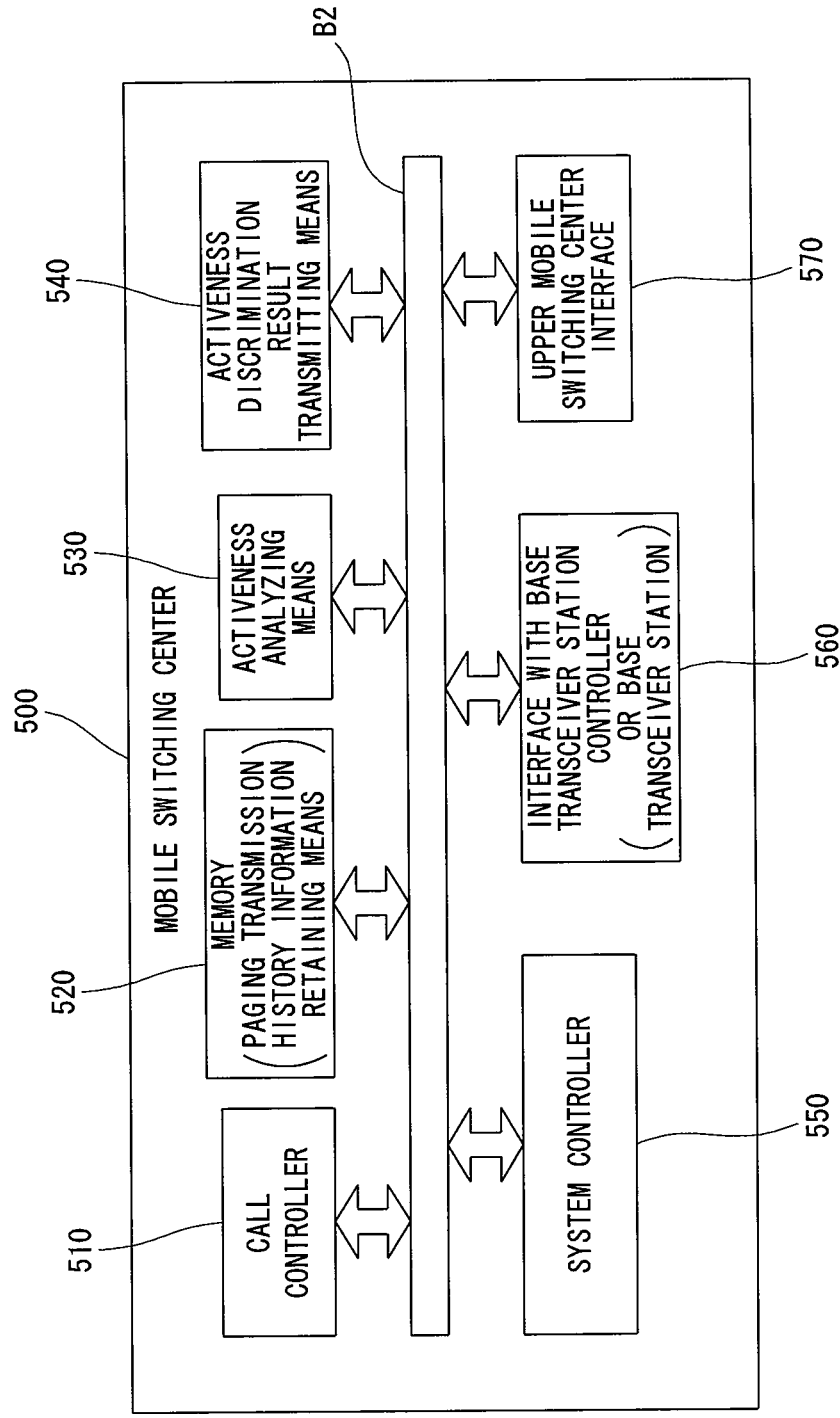
FIG. 10 is a functional block diagram illustrating a configuration of a mobile switching center according to one aspect of the present invention.

FIG. 10 is a functional block diagram illustrating a configuration of a mobile switching center according to one aspect of the present invention. The mobile switching center includes a call controller 510, a memory 520, activeness analyzing means 530, and activeness discrimination result transmitting means 540, which are connected to a system controller 550 via a bus B2, and which are configured to fulfill given functions under the management of the system controller 550. The call controller 510 is an important functional section of the mobile switching center for setting and releasing a call. The activeness analyzing means 530 discriminates whether the call requiring the setting to be recognized with a received signal corresponds to an active call or a non-active call that does not correspond to the active call. The activeness discrimination result transmitting means 540 transmits the discrimination result of the activeness analyzing process to the base transceiver station controller or the base transceiver station.

The mobile switching center is coupled to an external base transceiver station controller (or base transceiver station) via an interface 560 of the base transceiver station controller (or base transceiver station) connected to the bus B2. Likewise, the mobile switching center is coupled to a mobile switching center of an upper node via an upper mobile switching center interface 570 connected to the bus B2.

Next, the components of a mobile switching center 500 will be described in more detail. The call controller 510 is similar to that of a general mobile switching center of this type. The memory 520 operates under the control of the system controller 550 so as to function as paging transmission history information retaining means 520 in the mobile switching center 500 according to one aspect of the present invention. The paging transmission history information retaining means (memory) 520 retains paging transmission history information representing the history of paging transmission relating to the call from the mobile switching center 500.

The activeness analyzing means 530 analyzes a signal received from an external node such as a base transceiver station or the like, and discriminates, as to the setting request of the call recognized with the received signal, whether the call corresponds to an active call based upon an active connection request that has been generated according to a user's operation on the mobile station, as a trigger, or whether the call corresponds to a non-active call that is not the active call.

The result discriminated by the activeness analyzing means 530 of whether the call is an active call or a non-active call is transmitted to a base transceiver station controller (the above-described 3G system is employed as a mobile communication system) or a base transceiver station (the above-described LTE system is employed as a mobile communication system) by the activeness discrimination result transmitting means 540.

The base transceiver station controller or the base transceiver station (the above-described radio channel controller installed therein) that has received the discrimination result is capable of allocating a radio resource in an appropriate manner. This allows the allocation of given radio resources to more users, while reducing (without increasing) the user's stress caused by the packet communication rate to be sensed.

(Example of Resource Assignment According to the Present Invention)

FIG. 11 illustrates a resource allocation state according to one aspect of the present invention. As illustrated, the communication resource in a radio sector is allocated in an aspect that comparatively more resources (transmission rate is higher) are allocated to an active call based upon an active connection request that has been generated according to a user's operation, as a trigger. This reduces the user's stress caused by the packet communication rate to be sensed.

In addition, in a case where the call does not correspond to the above-described active call, but corresponds to a non-active call, comparatively fewer resources (transmission rate is lower) are allocated to the communication. This reduces the possibility of straining the resource for another communication that will cause the problem of degradation in the transmission rate.

It is therefore possible to allocate the definite resources to more users so that they hardly feel stress during the communication.

As described heretofore, the present invention has been described with reference to the drawings. In addition, the present invention has another technical concept as a radio channel controlling method, as will be described below.

Figure 12:
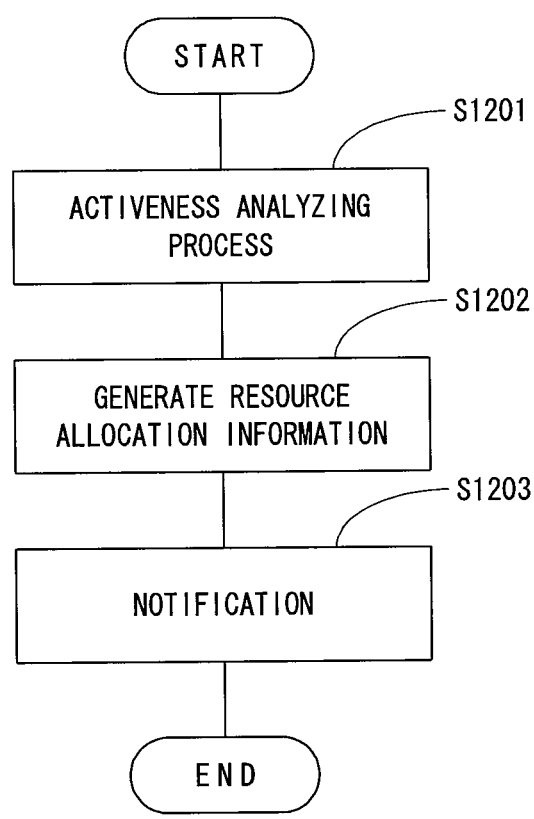
FIG. 12 is a flowchart showing a radio channel controlling method according to one aspect of the present invention.

FIG. 12 is a flowchart showing a radio channel controlling method according to one aspect of the present invention.

The radio channel controlling method according to one aspect of the present invention includes an activeness analyzing process (Step S1201), a resource allocation information generating process (Step S1202), and a notification process (Step S1203). In the activeness analyzing process, a received signal is analyzed to discriminate, as to a setting request of a call recognized with the received signal, whether the call corresponds to an active call based upon an active connection request that has been generated according to a user's operation on a mobile station, as a trigger, or whether the call corresponds to a non-active call that is not the active call. In the resource allocation information generating process, resource allocation information corresponding to the call is generated to allocate comparatively more resources to the call that has been discriminated to be an active call by the activeness analyzing process (Step S1201). In the notification process, the resource allocation is notified to a corresponding notification destination so as to allocate the resource according to the resource allocation information that has been generated by the resource allocation information generation process (Step S1202).

The notification process at Step S1203 notifies the resource allocation to a corresponding notification destination so as to allocate the resource according to the resource allocation information generated by the resource allocation information generation process at Step S1202.

The aforementioned corresponding notification destination has been described, as to each case, with reference to the sequential diagrams showing the radio channel controlling operations of FIG. 5 through FIG. 8.

By using the resource allocation information notified at Step S1203, the radio resource is allocated in an appropriate manner. It is therefore possible to allocate certain radio resources to more users, while reducing (without increasing) the user's stress caused by the packet communication rate to be sensed.

According to one aspect of the present invention, in a mobile communication system, it is possible to employ the technique of the present invention so that definite resources in a radio sector can be allocated to more users and the users hardly feel stress during the communication.

The present application is based on and claims priority from Japanese Patent Application No. 2007-289349, filed Nov. 7, 2007, the disclosure of which is hereby incorporated by reference herein in its entirety.

What is claimed is:

1. A radio channel controller comprising:
  received signal analyzing means which performs an activeness analyzing process for analyzing a signal received from an external node and determining, as to a setting request of a call recognized with the received signal, whether the call corresponds to an active call triggered by a user's operation on an originating-side mobile station for starting a call or sending information or a non-active call for receiving a call or information;
  resource allocation information generating means which generates resource allocation information for allocating a corresponding resource to the call in an aspect that comparatively more resources are allocated to the call that has been determined to correspond to the active call on the basis of a result of the activeness analyzing process of the received signal analyzing means;
  notification means which notifies the resource allocation information that has been generated by the resource allocation information generating means to a corresponding notification destination that allocates the resource according to the resource allocation information; and
  paging transfer history information retaining means which retains paging transfer history information representing a history of paging transmitted from a mobile switching center to a receiving-side mobile station;
  wherein the received signal analyzing means, by referring to the paging transfer history information retained by the paging transfer history information retaining means, determines that the call is the non-active call, when the paging transfer history information representing the history of paging transfer of the call transmitted from the mobile switching center is compared with information, representing a connection responsive to the paging, applied to a connection request transmitted from the receiving-side mobile station, and the paging transfer history information matches the information representing the connection responsive to the paging.

2. The radio channel controller according to claim 1, further comprising management information retaining means which retains management information referred to by the resource allocation information generating means so as to determine the resource to be allocated to the call.

3. The radio channel controller according to claim 2, wherein the management information retaining means retains a resource mapping table including a transmission rate of individual channel allocated to the active call and a transmission rate of individual channel allocated to the non-active call, as the management information to be relied on by the resource allocation information generating means so as to determine the resource to be allocated to the call.

4. A mobile communication system comprising the radio channel controller according to claim 1.

5. A mobile switching center adaptable to the mobile communication system of claim 4, the mobile switching center comprising:
  paging transmission history information retaining means which retains paging transmission history information representing a history of paging transmission from the mobile switching center, relating to the call;
  activeness analyzing means which performs an activeness analyzing process for analyzing a signal received from an external node, and determining, as to a setting request of a call recognized with the received signal, whether the call corresponds to an active call based upon an active connection request that has been generated according to a user's operation on the originating-side mobile station, as a trigger, or whether the call corresponds to a non-active call that is not the active call, on the basis of a verification of the call and the paging transmission history information retained by the paging transmission history information retaining means; and
  activeness determination result transmitting means which transmits a determination result of the activeness analyzing process performed by the activeness analyzing means to a corresponding base transceiver station controller or a corresponding base transceiver station.

6. A radio channel controlling method comprising the steps of:
  analyzing a signal received to determine, as to a setting request of a call recognized with the received signal, whether the call corresponds to an active call triggered by a user's operation on an originating-side mobile station for starting a call or sending information or a non-active call for receiving a call or information;

generating resource allocation information for allocating a corresponding resource to the call in an aspect that comparatively more resources are allocated to the call that has been determined to correspond to the active call on the basis of a result of the analyzing;
notifying the resource allocation information that has been generated to a corresponding notification destination that allocates the resource according to the resource allocation information; and
retaining paging transfer history information representing a history of paging transmitted from a mobile switching center to a receiving-side mobile station,
wherein in the analyzing step, by referring to the paging transfer history information retained in the retaining step, it is determined that the call is the non-active call, when the paging transfer history information representing the history of paging transfer of the call transmitted from the mobile switching center is compared with information, representing a connection responsive to the paging, applied to a connection request transmitted from the receiving-side mobile station, and the paging transfer history information matches the information representing the connection responsive to the paging.

7. The originating-side mobile station adaptable to the mobile communication system of claim 4, the originating-side mobile station comprising:
an operation section which receives an operation of a user;
an active connection request identifying section which identifies whether or not a connection request is an active connection request that has been generated by the operation on the operation section, as a trigger, when the connection request is issued to the radio channel controller;
an identification information generator which generates identification information representing the active connection request, when the connection request is identified to correspond to the active connection request by the active connection request identifying section;
a connection request generator which generates connection request information together with the identification information; and
a transceiver which transmits and receives information including the connection request information.

* * * * *